United States Patent
Youn

(10) Patent No.: US 9,136,940 B2
(45) Date of Patent: *Sep. 15, 2015

(54) METHOD FOR RESIZING NETWORK CONNECTION IN THE OPTICAL TRANSPORT NETWORK SUPPORTING PROTECTION SWITCHING

(71) Applicant: Electronics and Telecommunications Research Institute, Daejeon-si (KR)

(72) Inventor: Ji-Wook Youn, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 140 days.

This patent is subject to a terminal disclaimer.

(21) Appl. No.: 13/965,788

(22) Filed: Aug. 13, 2013

(65) Prior Publication Data
US 2014/0050470 A1    Feb. 20, 2014

(30) Foreign Application Priority Data

Aug. 14, 2012 (KR) .................. 10-2012-0089151
Aug. 24, 2012 (KR) .................. 10-2012-0093219
Aug. 13, 2013 (KR) .................. 10-2013-0095854

(51) Int. Cl.
*H04J 14/00* (2006.01)
*H04B 10/03* (2013.01)
*H04B 10/032* (2013.01)
*H04J 3/14* (2006.01)
*H04J 3/16* (2006.01)
*H04Q 11/00* (2006.01)

(52) U.S. Cl.
CPC ............... *H04B 10/032* (2013.01); *H04J 3/14* (2013.01); *H04J 3/1652* (2013.01); *H04Q 11/0062* (2013.01); *H04Q 2011/0081* (2013.01); *H04Q 2011/0086* (2013.01)

(58) Field of Classification Search
USPC ....................................................... 370/228
See application file for complete search history.

(56) References Cited

U.S. PATENT DOCUMENTS

| | | | |
|---|---|---|---|
| 2007/0292129 A1* | 12/2007 | Yan et al. ................... | 398/5 |
| 2011/0286744 A1* | 11/2011 | Shin et al. .................. | 398/45 |
| 2012/0163812 A1* | 6/2012 | Youn et al. ................. | 398/45 |
| 2013/0011132 A1* | 1/2013 | Blair ........................... | 398/2 |
| 2013/0101292 A1* | 4/2013 | Lanzone et al. ............ | 398/66 |
| 2013/0243427 A1* | 9/2013 | Lin ............................. | 398/45 |
| 2013/0259476 A1* | 10/2013 | Shinohara et al. ......... | 398/52 |
| 2013/0279904 A1* | 10/2013 | Tang et al. ................. | 398/25 |
| 2013/0294229 A1* | 11/2013 | Togo et al. ................. | 370/228 |
| 2014/0016925 A1* | 1/2014 | Ceccarelli et al. ......... | 398/5 |

FOREIGN PATENT DOCUMENTS

KR    10-2011-0127077 A    11/2011

* cited by examiner

*Primary Examiner* — Li Liu
(74) *Attorney, Agent, or Firm* — Rabin & Berdo, P.C.

(57) ABSTRACT

There is provided a method for resizing a network connection in an optical transport network that supports protection switching and receives a flexible Optical channel Data (ODUflex(GFP)) signal. In addition, Hitless Adjustment of ODUflex(GFP) (HAO) procedure includes Suppress Bandwidth Resize (SBR) information that prevents a Bandwidth Resize (BWR) protocol from being initiated. Based on the SBR information, only the LCR protocol is executed at nodes located on a protection path for protection switching, except for the BWR protocol. On the other hand, both the LCR protocol and the BWR protocol are executed at nodes located on a working path.

16 Claims, 6 Drawing Sheets

Link Connection Resizing

| Column | 1 | 2 | 3 | 4 | 5 | 6 | 7 | 8 |
|---|---|---|---|---|---|---|---|---|
| 1 | BWR_IND | RES | RES | | RES | | | |
| 2 | BWR_IND | NCS | RES | | RES | | | |
| 3 | CRC-3 | | | | RES | | | |

OPUflex RCOH

| Row | Column 15 |
|---|---|
| 1 | RCOH1 |
| 2 | RCOH2 |
| 3 | RCOH3 |
| 4 | PSI |

OPUflex OH

| Column | 1 | 2 | 3 | 4 | 5 | 6 | 7 | 8 |
|---|---|---|---|---|---|---|---|---|
| 1 | RP | SBR | RES | | | TPID | | |
| 2 | TSCC | RES | RES | TSGS | CTRL | | TPID | |
| 3 | CRC-3 | | | | CRC-5 | | | |

HO OPUk RCOH

| Row | Column 15 |
|---|---|
| 1 | RCOH1 |
| 2 | RCOH2 |
| 3 | RCOH3 |
| 4 | PSI |

HO OPUk OH

METHOD FOR RESIZING NETWORK CONNECTION IN THE OPTICAL TRANSPORT NETWORK SUPPORTING PROTECTION SWITCHING

CROSS-REFERENCE TO RELATED APPLICATION(S)

This application claims the benefit under 35 U.S.C. §119 (a) of a Korean Patent Application Nos. 10-2012-0089151, filed on Aug. 14, 2012; No. 10-2012-0093219, filed on Aug. 24, 2012; and No. 10-2013-0095854, filed on Aug. 13, 2013, in the Korean Intellectual Property Office, the entire disclosures of which are incorporated herein by references for all purposes.

BACKGROUND

1. Field

The following description relates to a method for resizing a network connection in an optical transport network, and, more specifically, to a method for resizing a network connection in an optical transport network that supports protection switching.

2. Description of the Related Art

An optical transport network boasts a wide bandwidth, high reliability and a well-developed protection switching function, and supports Operations Administration and Management (OAM) technologies. To effectively receive packet data, the amount of which is now explosively increasing, there are many attempts to develop a method for transporting packet data in an optical transport network. International Telecommunication Union Telecommunication standardization sector (ITU-T), which is an international organization in charge of standardization work, has standardized a technology for more effectively receiving Ethernet data in an optical transport network. In an effort to flexibly receive a client signal, especially a packet signal, with high transmission efficiency, the ITU-T, defines a flexible Optical channel Data Unit (ODUflex) signal which refers to a Generic Framing Procedure (GFP)-encalsulated packet signal that adds ODUflex overhead to ODUflex payload. In general, the ODUflex signal is used as an ODUflex(GFP) signal.

In addition, the ITU-T has developed a resize protocol that can increase or decrease a size of the ODUflex(GFP) signal without affecting a network. Specifically, the resize protocol is defined as ITU-T G.7044/Y.1347(10/2011) standard or an Hitless Adjustment of ODUflex(GFP) (HAO) procedure. The ITU-T G.7044/Y.1347(10/2011) stand or the HAO process is a resize procedure for increasing or decreasing a network connection. Korea Patent Publication No. 10-2011-0127077 introduces a dynamic packet transmission technology titled "METHOD AND APPARATUS FOR TRANSMITTING PACKET IN OPTICAL TRANSPORT NETWORK" that solves the drawbacks of an existing HAO protocol to increase or decrease the amount of packet to be transmitted without packet loss regardless of a size of packet frame.

In this reference, it is assumed that actual packet data is transmitted, and a dynamic resize procedure for a path on which the packet data is transmitted is defined. In addition, for swift restoration at an occurrence of any error or fault in a network that support protection switching, a protection path is set in advance. The HAO protocol according to the ITU-T G.7044/Y.1347(10/2011) stand may be applied in a procedure for changing a bandwidth of a working path in an optical transport network receiving an ODUflex signal, but may be difficult to be applied in a procedure for changing a bandwidth of a protection path.

SUMMARY

The following description aims to provide a method for resizing a network connection in an optical transport network where a protection path as well as a working path is set for protection switching.

The following description also aims to solve a problem that occurs when the optical transport network receives an ODUk (Optical channel Data Unit, k=1, 2, 3, 4, flex) signal for protection switching.

To meet the above-described goals, in one general aspect of the present invention, there is provided a method for resizing a network connection in an optical transport network that supports protection switching and receives a flexible Optical channel Data Unit (ODUflex(GFP)) signal, wherein a Link Connection Resize (LCR) protocol of Hitless Adjustment of ODUflex(GFP) (HAO) procedure comprises Suppress Bandwidth Resize (SBR) information that prevents a Bandwidth Resize (BWR) protocol from being initiated, the method including executing, at first nodes located on a protection path P for protection switching, only the LCR protocol except for the BWR protocol.

The SBR information may be contained in LCR protocol overhead.

The SBR information may be contained in the LCR protocol overhead as a reserve field (RES) bit of in High Order-Optical channel Payload Unit-k Overhead (HO OPUk OH) Resize Control Overhead (RCOH).

Both the LCR protocol and the BWR protocol may be executed at second nodes located on a working path W for protection switching.

The HAO procedure may be a procedure for increasing a network connection, and the HAO procedure may be terminated without executing the BWR protocol by the first nodes receiving the SBR information, the first nodes that operate a Generic Mapping Procedure (GMP) normal mode, rather than a GMP special mode, after completion of the LCR protocol.

The HAO procedure may be a procedure for decreasing network connection, and the HAO procedure may be terminated without executing the BWR protocol by the first nodes receiving the SBR information, the first nodes that operate on the GMP normal mode, rather than the GMP special mode, ever since initiation of the LCR protocol.

In still another aspect of the present invention, there is provided a method for increasing a network connection in an optical transport network that supports protection switching and receives a flexible Optical channel Data Unit (ODUflex (GFP)) signal, the method including initiating, at first nodes located on a protection path for the protection switching, a Link Connection Resize (LCR) protocol of Hitless Adjustment of ODUflex(GFP) (HAO) procedure; increasing, at the first nodes, a link connection to increase a number of tributary slots (TSs); and in response to receiving Suppress Bandwidth Resize (SBR) information that prevents execution of a Bandwidth Resize (BWR) protocol, terminating the HAO procedure without executing the BWR protocol at the first nodes.

The SBR information may be contained in LCR protocol overhead.

The SBR information may be contained in the LCR protocol as a reserve field (RES) of High Order-Optical channel Payload Unit-k Overhead (HO OPUk OH) Resize Control Overhead (RCOH).

In the terminating of the HAO procedure, the first nodes receiving the SBR information may operate on a Generic Mapping Procedure (GMP) normal mode, rather than a GMP special mode after the completion of the LCR protocol.

In the initiating of the LCR protocol, a High Order-Optical channel Payload Unit-k Overhead (HO OPUk OH) Resize Control Overhead (RCOH) signal indicating "ADD" in a control (CTRL) field of LCR protocol overhead may be used.

The method may further include terminating the HAO procedure by executing, both the LCR protocol and the BWR protocol at second nodes on a working path for the protection switching.

In yet another aspect of the present invention, there is provided a method for decreasing a network connection in an optical transport network that supports protection switching and a flexible Optical channel Data Unit (ODUflex(GFP)) signal, the method including initiating, at first nodes located on a protection path for protection switching, a Link Connection Resize (LCR) protocol of Hitless Adjustment of ODUflex(GFP) (HAO) procedure; and if Suppress Bandwidth Resize (SBR) information that prevents execution of a Bandwidth Resize (BWR) protocol of the HAO procedure is received after the initiation of the LCR protocol, terminating the HAO procedure by continuously executing the LCR protocol but not executing the BWR protocol at the first nodes.

The SBR information may be contained in LCR protocol overhead.

The SBR information may be contained in the LCR protocol overhead as a reserve field (RES) bit of High Order-Optical channel Payload Unit-k Overhead (HO OPUk OH) Resize Control Overhead (RCOH).

In the terminating of the HAO procedure, the first nodes receiving the SBR information may operate on a Generic Mapping Procedure (GMP) normal mode, rather than a GMP special mode.

In the initiating of the LCR protocol, a High Order-Optical channel Payload Unit-k Overhead (HO OPUk OH) Resize Control Overhead (RCOH) signal indicating "REMOVE" in a control (CTRL) field of LCR protocol overhead may be used.

The method may further include terminating the HAO procedure by executing both the LCR protocol and the BWR protocol at the second nodes.

Other features and aspects may be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

FIG. 1 is a diagram illustrating a format of Resize Control Overhead (RCOH) defined by ITU-T G.7044/Y.1347(10/2011).

FIG. 4 is a diagram illustrating a format of Resize Control Overhead (RCOH) according to an exemplary embodiment of the present invention.

Figure 2:
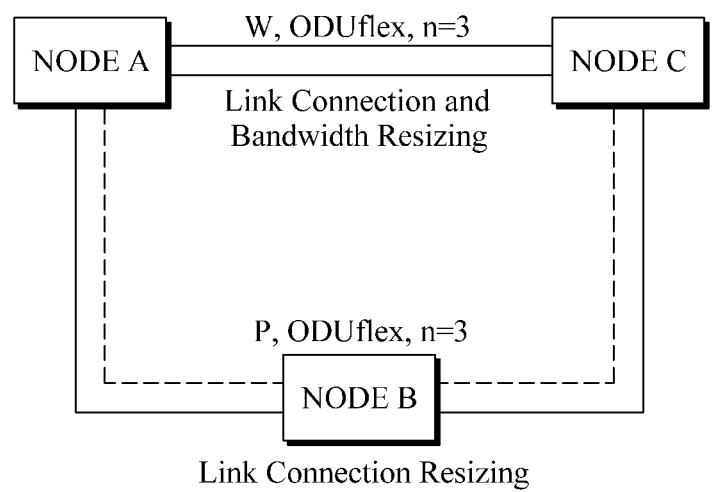
FIG. 2 is a diagram illustrating protection switching in an optical transport network receiving an ODUflex signal and a resize procedure therefor.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

The following embodiments of the present invention relate to supporting protection switching in an optical transport network that receives an ODUflex(GFP) defined in ITU-T. Protection switching is one of methods for swiftly restoring connection at nodes when a fault occurs on a network. For protection switching, a protection path P with a specific bandwidth is set between nodes in advance, in addition to a working path W. Thus, when communication between nodes is impossible via the working path W due to occurrence of a fault on a network, communication between nodes is restored through the protection path P.

The ITU-T G.7044/Y.1347(10/2011) standard defines a procedure of resizing a network connection, the procedure which does not lead to packet loss on a network receiving a ODUflex(GFP) signal. The procedure is referred to as Hitless Adjustment of ODUflex(GFP) (HAO) procedure. According to the ITU-T G.7044/Y.1347(10/2011) standard, the HAO procedure includes Link Connection Resize (LCR) protocol and a Bandwidth Resize (BWR) protocol. (Hereinafter, 'the network connection resize' is meant to include the LCR protocol and the BWR protocol) That is, the procedure of resizing a network connection needs to be done using the LCR protocol and the BWR protocol separately. In addition, various kinds of information required for executing an LCR protocol and a Bandwidth Resize (BWR) protocol, respectively, is included in Resize Control Overhead (RCOH) and then transferred.

Figure 1:
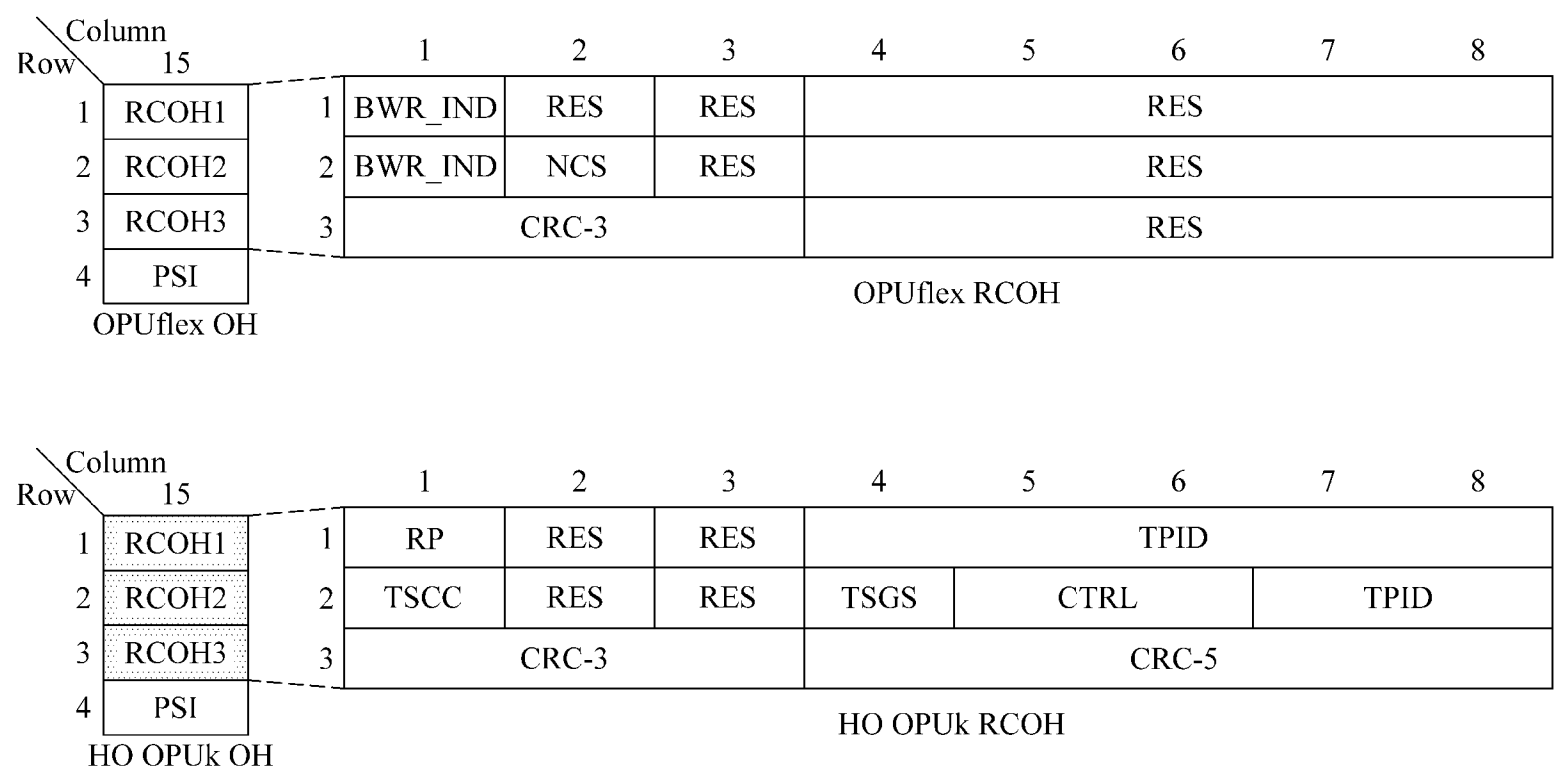

FIG. 1 is a diagram illustrating a format of RCOH defined by the ITU-T G.7044/Y.1347(10/2011) standard. Referring to FIG. 1, RCOH is included in OPUflex RCOH of OPUflex overhead (OH) or in High Order-Optical channel Payload Unit-k overhead (HO OPUk OH) RCOH of HO OPUk OH, and then transferred. Information included in the RCOH may be classified into information for LCR protocol (that is, LCR protocol overhead) and information for BWR protocol (that is, BWR protocol overhead). The LCR protocol overhead includes a control (CTRL) field, a Tributary Port ID (TPID) field and a Tributary Slot Group Status (TSGS) bit. The BWR protocol overhead includes a Network Connectivity Status (NCS) bit, a Tributary Slot Connectivity Check (TSCC) bit, a Resizing Protocol indicator (RP) bit and a Bandwidth Resize Indicator (BWR_IND) bit.

FIG. 2 is a diagram for explaining a concept of protection switching in an optical transport network that receives an ODUflex signal and a concept of a resize procedure for the optical transport network. Referring to FIG. 2, a working path W is set between end nodes A and C, on which actual data is transmitted. In addition, a protection path P connects the end nodes A and C to one another through an intermediate node B for protection switching. FIG. 2 illustrates an example in which the working path W between the nodes A and C consist of three TSs (TS, n=3) while the protection path P that connects the nodes A and C through the node B consists of three TSs (TS, n=3). Yet, the number of TSs in the above case is merely exemplary. Further, the TSs of the working path W do not need to be consecutive, and instead, the working path W may consist of arbitrary TSs. Moreover, TSs of the protection path P does not need to be the same as those of the working path W.

In order to effectively support protection switching when there is a change in a network connection (for example, increase or decrease in the number of TSs) in an optical transport network configured as shown in FIG. 2, a procedure of resizing a network connection has to be completed with respect to both the working path W and the protection path P. In addition, in order to complete the procedure of resizing a network connection with respect to both the working path W and the protection path P when the ITU-T G.7044/Y.1347(10/2011) standard is applied to the optical transport network that receives an ODUflex signal, a resize procedure according to the HAO procedure has to be done with respect to both the working path W and the protection path P. Specifically, in order to increase or decrease a bandwidth of the working path W in the optical transport network, an HAO protocol should be executed not only between nodes of the working path W (for example, between the nodes A and B in FIG. 2) but also between nodes of the protection path P (for example, between the nodes A and B and between the nodes B and C in FIG. 2). That is, the resize procedure according to the ITU-T G.7044/Y.1347(10/2011) standard has to be performed on the protection path P as well as the working path W. To put it simply, each of an LCR protocol and a BWR protocol needs to be executed with respect to both the working path W and the protection path P.

However if there is not error or fault on a protection-switching supporting optical transport network configured as shown in FIG. 2 so the working path W operates normally, an OPUflex signal is transmitted only via the working path W, not via the protection path P. Accordingly, a node located only on the protection path P is unable to transmit and/or receive the OPUflex signal, and, in turn, cannot utilize information included in an OPUflex RCOH. Since the information included in an OPUflex RCOH is not transmitted via a protection path P, the resize procedure according to the ITU-T G.7044/Y.1347(10/2011) standard cannot be completed which aims to support protection switching in an optical transport network that receives an ODUflex signal.

However, the present invention is able to solve the above-described drawback as follows: an LCR protocol and a BWR protocol, both of which are according to the ITU-T G.7044/Y.1347(10/2011) standard, are executed on a working path W, but only the LCR protocol is executed on a protection path P by adding specific information to an LCR protocol overhead (for example, an HO OPUk RCHO) so as to prevent the BWR protocol from being executed. Specifically, both a link connection and a bandwidth of the working path W is changed, but only the link connection, except for the bandwidth, of the protection path P is changed by adding specific information, for example, Suppress Bandwidth Resize (SBR) information, to LCR protocol overhead (for example, HO OPUk RCOH). In other words, an actual data signal is transmitted via the working path W, but not via the protection path P, even in an optical transport network that supports protection switching, so that transmission of an ODUflex signal may not be affected although a bandwidth of a protection path is not increased or decreased during the network connection resize procedure.

Hereinafter, a method for resizing a network connection in an optical transport network that receives an ODUflex signal and supports protection switching according to an exemplary embodiment of the present invention will be described.

Figure 3:
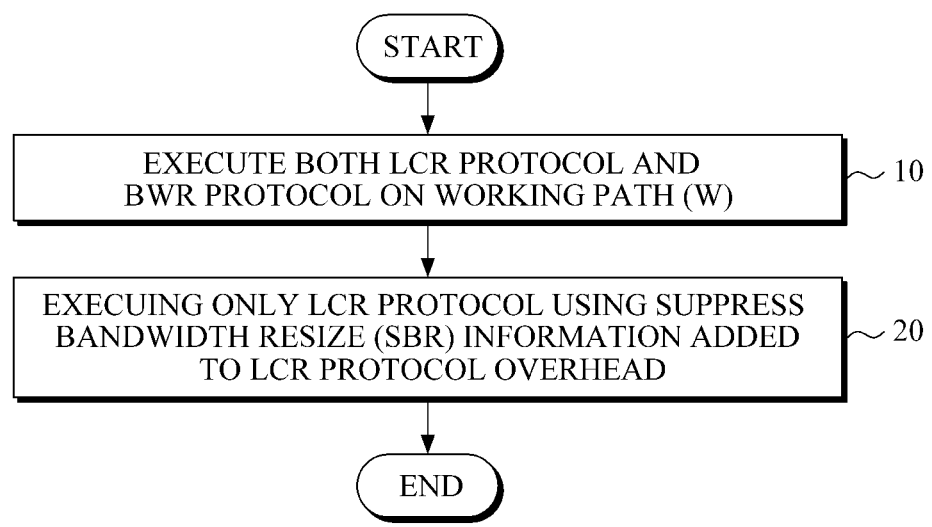
FIG. 3 is a flow chart illustrating a method for resizing a network connection in the optical transport network shown in FIG. 2.

FIG. 3 is a flow chart illustrating a method for resizing a network connection in the optical transport network shown in FIG. 2, which receives an ODUflex signal and supports protection switching, according to an exemplary embodiment of the present invention. In the following, descriptions about an LCR protocol and a BWR protocol, both of which are according is to an HAO protocol, will be provided, and any specific description not provided herein may be the same as specified in the ITU-T G.7044/Y.1347(10/2011) standard.

Referring to FIGS. 2 and 3, if a network connection resize procedure in an optical transport network begins, a resize procedure starts with respect to a working path W that directly connects nodes A and C with each other in operation 10. A resize procedure according to the ITU-T G.7044/Y.1347(10/2011) standard includes executing both an LCR protocol and a BWR protocol, and details thereof are not provided herein since the same is specified in detail in the ITU-T G.7044/Y.1347(10/2011) standard.

With respect to a protection path P that connects the nodes A and C via the node B, the LCR protocol is executed but the BWR protocol is not executed by adding predetermined information, such as SBR information, which prevents the BWR protocol from being initiated, to LCR protocol overhead in operation 20. That is, the BWR protocol is not executed on the protection path P. Meanwhile, FIG. 3 illustrates an example where operation 10 is performed before operation 20, but it merely aims to clarify the features of the present invention. That is, operation 20 may be performed before operation 10 or operation 10 and 20 may be performed concurrently.

In FIG. 3, the predetermined information preventing initiation of the BWR protocol may be an SBR bit, but it is merely an example and can be called differently. The SBR bit may be included in the LCR protocol overhead. For example, the SBR bit may be added to any reserve field (RES) of HO OPUk RCOH.

FIG. 4 is a diagram illustrating a format of RCOH according to an exemplary embodiment of the present invention. Referring to FIG. 4, a format of RCOH is such that an SBR bit is added to any reserve field (RES) of RCOH (See FIG. 1) according to the ITU-T G.7044/Y.1347(10/2011) standard. In FIG. 4 illustrates an example in which an SBR bit is added to the RES in column 15, row 1, bit 2 of HO OPUk OH, but it is merely exemplary. That is, it is apparent for those skilled in the art that an SBR bit may be added to another RES in column 15, row 1 or 2 of HO OPUk OH.

Figure 5:
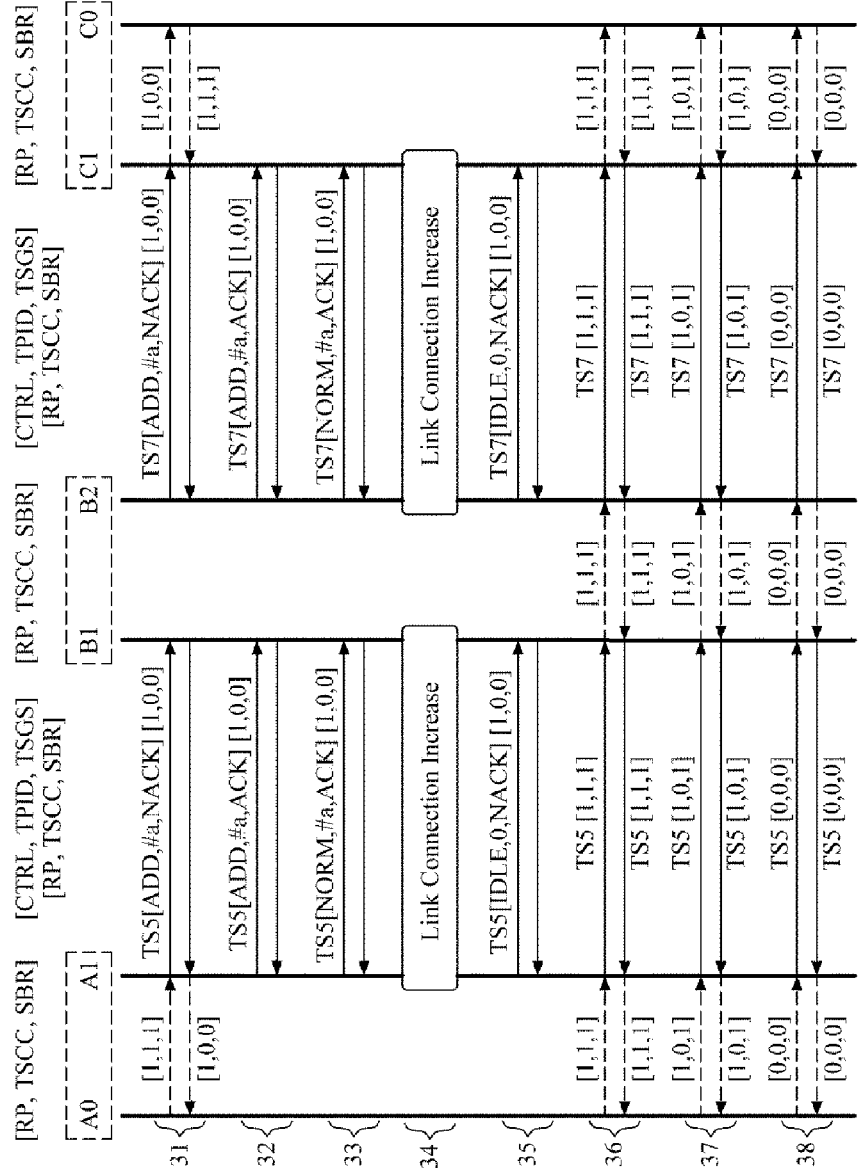
FIG. 5 is a flow chart illustrating an example in which operation 20 in FIG. 3 is applied in a procedure of increasing a network connection.

FIG. 5 is a flow chart illustrating an example of increasing a network connection with respect to a protection path P in the event that a bandwidth of an ODUflex signal transmitted via a working path W in the optical transport network shown in FIG. 2 is increased, the event which is, for example, when the number of TSs increases by one from n=3 to n=4. That is, FIG. 5 is an example in which operation 20 in FIG. 3 is applied in a network connection increase procedure. Hereinafter, referring to FIG. 5, detailed description about a network connection procedure will be provided. It is apparent that number indicating a TS to be added in FIG. 5 (that is, TS 5 and TS 7) and a numerical value defined in the TPID field (that is, a) are merely exemplary. In addition, what is indicated by "ADD", "NORM" or "IDLE" which is a command corresponding to a CTRL field, what is indicated by "NACK" or "ACK" which corresponds to a TSGS bit, what is indicated by "0" or "1" which corresponds to RP bit, and what is indicated by "0" or "1" which corresponds to TSCC bit complies with the above-described the ITU-T G.7044/Y.1347(10/2011) standard, so that details description thereof are not provided herein.

In order to initiate an LCR protocol, an increase command for increasing network connection is transmitted to each node located on a protection path P (not shown). Specifically, the increase command is transmitted to a node A (A0, A1), a node B (B1, B2) and a node C (C0, C1). Each pair of the nodes A0 and A1, the nodes B0 and B2 and the nodes C0 and C1 corresponds to the nodes A, B and C in FIG. 2, respectively. The increase command is a command indicating addition of TS, and may be transmitted from a Network Management System (NMS) or a control plane to each node.

Each node receiving the increase command starts to initiate the LCR protocol. Specifically, each node checks configuration or availability of a TS to be added or a set of TSs to is be added. After the check, the end node A, specifically the node A0, and the node C, specifically the node C0, set a signal to indicate [CTRL, TPID, TSGS]=[ADD, # a, NACK] and [RP, TSCC, SBR]=[1, 1, 1], and then transmit to the intermediate node B the signal set to be [CTRL, TPID, TSGS]=[ADD, # a, NACK] and RP=1, in operation 31. At this time, a TSCC value and an SBR value are blocked between end nodes, specifically, between the nodes A1 and C1, so that only an RP value without a TSCC value and an SBR value, that is, [RP, TSCC, SBR]=[1, 0, 0], is transmitted to the intermediate node B (B1, B2) along with [CTRL, TPID, TSGS]=[ADD, # a, NACK]. In addition, the intermediate node B (B1, B2) set a signal to indicate [CTRL, TPID, TSGS]=[ADD, # a, NACK] and [RP, TSCC, SBR]=[1, 0, 0], and then transmit the signal indicating [CTRL, TPID, TSGS]=[ADD, # a, NACK] and [RP, TSCC, SBR]=[1, 0, 0] to the end nodes A and C in operation 31. Although not illustrated in FIG. 5, if a plurality of intermediate nodes are provided, the intermediate node B (B1, B2) may transmit the same value of RP=1 to adjacent nodes.

After checking whether a signal indicating "ADD" in a CTRL field is received from any adjacent node and whether configuration of a TS of a local port is the same as that of a TS of a port of the adjacent node, each node (or a port of each node) transmits a signal set as a "ACK" value in a TSGS bit to the adjacent node in operation 32. Specifically, the end nodes A and C transmit and receive to and/or from the intermediate node B a signal that is set to be [CTRL, TPID, TSGS]=[ADD, # a, ACK] and [RP, TSCC, SBR]=[1, 0, 0].

As such, if LCR handshaking is successfully completed in two directions, each node (or a port of each node) starts a link connection increase procedure in operation 33 and 34. Herein, the fact that the LCR handshaking is successfully completed means that a configuration check of TS related to resizing the same link connection has been passed, and, at the same time, a signal set to have "ACK" in a TSGS bit is transmitted and received. If the signal of "ACK" is received on every TS to be added, a signal of [NORM, # a, ACK], rather than a signal of [ADD, # a, ACK], is received and transmitted between an end node (or a port of an end node) and an intermediate node at the resize multiframe boundary after the LCR handshaking in operation 33. The change from [ADD, # a, ACK] into [NORM, # a, ACK] makes a downstream port notified of that link connection increase would start at the next resize multiframe boundary. Then, at the first resize multiframe boundary after transmitting [NORM, # a, ACK], the nodes start the link connection increase in operation 34.

After completing the LCR resize and receiving a signal of CTRL=NORM, each of the nodes A, B and C exit the LCR protocol by transmitting [IDLE, 0, NACK] in operation 35. After checking that the signal of CTRL=IDLE is received from an adjacent node, the LCR protocol is terminated If the LCR protocol is terminated, the end nodes A and C transmits values blocked in operation 31, that is, a TSCC value and an SBR value, to the intermediate node B in operation 36. Specifically, the nodes A1 and C1 may set a signal to indicate [RP, TSCC, SBR]=[1, 1, 1], and then may transmit the signal set to indicate [RP, TSCC, SBR]=[1, 1, 1] to the intermediate node B. Meanwhile, FIG. 5 illustrates an example in which a signal set as [RP, TSCC, SBR]=[1, 1, 1] is transmitted from A0 and C0 to A1 and C1, respectively, but it is merely exemplary. In addition, in FIG. 5, the signal set as [RP, TSCC, SBR]=[1, 1, 1] is transmitted from the intermediate node B (B1, B2) to each of the end nodes A (A0, A1) and C (C0, C1).

According to the conventional the ITU-T G.7044/Y.1347 (10/2011) standard, each node receiving a signal set as TSCC=1 transmits a reply signal set as NCS=ACK so that the node may initiate a BWR protocol on a Generic Mapping Procedure (GMP) special mode. However, according to embodiments of the present invention, each node receives a signal set as TSCC=1 and SBR=1 so that the node may operate on a GMP normal mode instead of the GMP special mode. As a result, the reply signal set as NCS=ACK is not transmitted from a reception node to a transmission node, and the BWR protocol is not initiated.

As such, nodes receiving a signal of TSCC=1 and SBR=1 operate on a GMP normal mode. The end nodes A (A0, A1) and C (C0, C1) as well as the intermediate node B (B1, B2) operate on the GMP normal mode. Each of the nodes A, B and C notifies an adjacent node that each of the nodes A, B and C operates on the GMP normal mode, and thus, unable to initiate the BWR protocol. To that end, each of the nodes A, B and C transmits to an adjacent node a signal set as RP=1 and TSCC=0, that is, a signal of [RP, TSCC, SBR]=[1, 0, 1] in operation 37 so as to prevent the adjacent node from entering the GMP special mode to execute the BWR protocol. In addition, the reply signal set as NCS=ACK is not transmitted from each of the nodes A, B and C to any adjacent node thereof.

If receiving and transmitting a signal set as TSCC=0 and SBR=1, the end nodes A and C recognizes that the HAO protocol is completely executed. The end nodes change each of RP and SBR values to be "0", and transmit a signal set as the changed RP and SBR values in operation 38 so as to notify adjacent nodes that a network connection resize procedure is completed. Thus, if a signal set as [RP, TSCC, SBR]=[0, 0, 0] is successfully received and transmitted, the network connection resize procedure ends.

Figure 6:
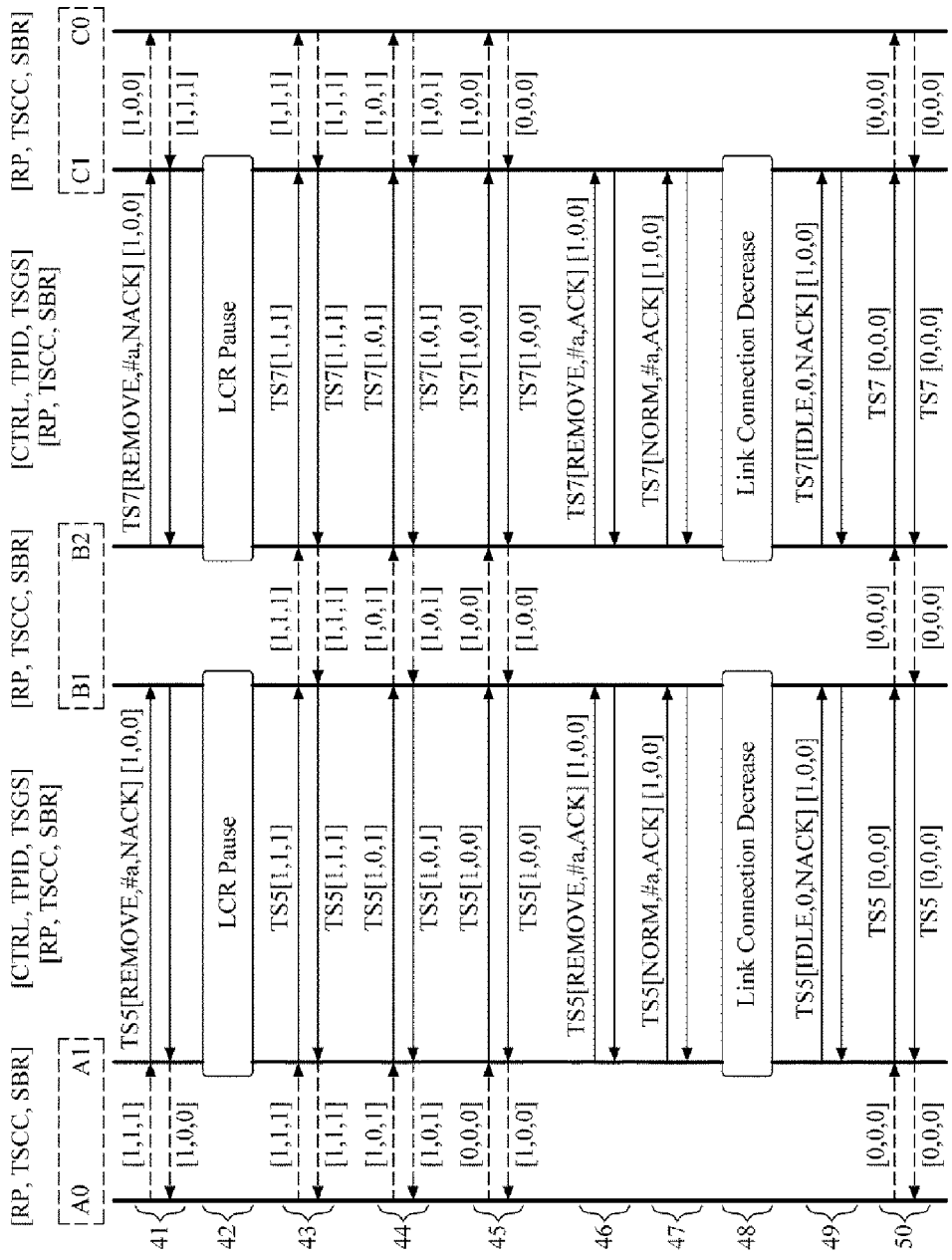
FIG. 6 is a flow chart illustrating an example in which operation 20 in FIG. 3 is applied in decreasing a network connection.

FIG. 6 is a flow chart illustrating a procedure of decreasing network connection of an ODUflex signal transmitted via a protection path in the event that a bandwidth of an ODUflex signal transmitted via a working path W in the optical transport network shown in FIG. 2 is decreased, for example when the number of TS is decreased from 3 to 2. That is, FIG. 6 illustrates an example in which operation 20 in FIG. 3 is applied in a network connection decreasing procedure. In addition, it is apparent that number indicating a TS to be removed (that is, TS5 and TS 7 in FIG. 6) and a numerical value in the TPID field of TS5 and TS7 (that is, # a) are exemplary. Further, in FIG. 6, what is indicated by "REMOVE", "NORM" or "IDLE" is which is commands in the CTRL field, what is indicated by "NACK" or "ACK" which corresponds to a TSGS bit, what is indicated by "0" or "1" which corresponds to a RP bit, and what is indicated by "0" or "1" which corresponds to TSCC bit complies with the above-described the ITU-T G.7044/Y.1347(10/2011) standard, so that details description thereof are not provided herein.

In order to initiate an LCR protocol, a decrease command for decreasing network connection is transmitted to each node, that is, a node A (A0, A1), a node B (B1, B2) and a node C (C0, C1), which is located on a protection path P (not shown). As described above, each pair of the nodes A0 and A1, the nodes B0 and B2 and the nodes C0 and C1 corresponds to the nodes A, B and C in FIG. 2, respectively. The decrease command is a command indicating removal of a TS, and may be transmitted from a Network Management System (NMS) or a control plane to each node.

Each node receiving the decrease command starts to initiate an LCR protocol. Specifically, the end nodes A and C, which are specifically the node A0 and C0, respectively, sets a signal set as [CTRL, TPID, TSGS]=[REMOVE, # a, NACK] and [RP, TSCC, SBR]=[1, 0, 0], and transmits the signal of [CTRL, TPID, TSGS]=[REMOVE, # a, NACK] and [RP, TSCC, SBR]=[1, 1, 1] to the intermediate node B in operation 41. At this time, a TSCC value and a SBR value are blocked between end nodes, specifically, between the nodes A1 and C1, and only a RP value without a TSCC value and an SBR value, that is, [RP, TSCC, SBR]=[1, 0, 0] is transmitted to the intermediate node B along with [CTRL, TPID, TSGS]=[REMOVE, # a, NACK]. In addition, the intermediate node B (B1, B2) outputs to the end nodes A and C a signal set as [CTRL, TPID, TSGS]=[REMOVE, # a, NACK] and RP=1 in operation 41. Although not illustrated in FIG. 6, if a plurality of intermediate nodes are provided, the intermediate node B (B1, B2) may transmit the same signal set as RP=1 to adjacent nodes.

After checking both whether a signal set to have "REMOVE in the CTRL field is received from any adjacent node and whether configuration of a TS of a local port is the same as that of a TS of a port of the adjacent node, each of the nodes A (A0, A1), B (B1, B2) and C (C0, C1) suspends the LCR protocol in operation 42.

If the LCR protocol is suspended, the end nodes A and C transmits the values blocked in operation 41, that is, a TSCC value and an SBR value, to the intermediate node B in operation 43. Specifically, the nodes A1 and C1 may set a signal to indicate [RP, TSCC, SBR]=[1, 1, 1], and may transmit the signal of [RP, TSCC, SBR]=[1, 1, 1] to the intermediate node B. Meanwhile, FIG. 6 illustrates an example in which a signal set as [RP, TSCC, SBR]=[1, 1, 1] is transmitted from A0 and C0 to A1 and C1, respectively, but it is merely exemplary. In addition, the signal set as [RP, TSCC, SBR]=[1, 1, 1] is transmitted to the end nodes A (A0, A1) and C (C0, C1) via the intermediate node B (B1, B2).

According to the conventional ITU-T G.7044/Y.1347(10/2011) standard, each node receiving a signal set as TSCC=1 transmits a replay signal set as NCS=ACK so as to initiate a BWR protocol in a Generic Mapping Procedure (GMP) special mode. However, according to embodiments of the present invention, each node receives a signal set as TSCC=1 and SBR=1 so that the node may operate in a GMP normal mode, rather than in the GMP special mode. As a result, the replay signal set as NCS=ACK is not transmitted from a receipt node to a transmission node, and thus, the BWR protocol is not initiated.

As such, each node receiving both TSCC=1 and SBR=1 operates on a GMP normal mode, rather than a GMP special mode. The end nodes A (A0, A1) and C (C0, C1) as well as the intermediate mode B (B 1, B2) operate on a GMP normal mode. In addition, such nodes notify adjacent nodes that the nodes operate on a GMP normal mode, and thus, are unable to initiate the BWR protocol. To that end, the nodes A (A0, A1), B (B1, B2) and C (C0, C1) may is transmit to any adjacent node thereof a signal set as RP=1 and TSCC=0, that is a signal set as [RP, TSCC, SBR]=[1, 0, 1] in operation 44 so that the adjacent node may be prevented from entering a GMP special mode to initiate the BWR protocol. In addition, the response signal set as NCS=ACK is not transmitted.

Next, the end nodes A and C, which transmit and receive the signal set as RP=1 and TSCC=0 with respect to adjacent nodes, sets a signal to indicate [RP, TSCC, SBR]=[0, 0, 0] and transmits the signal set to indicate [RP, TSCC, SBR]=[0, 0, 0] to the intermediate node B in operation 45. At this point, an RP value is blocked between end nodes, specifically, the nodes A1 and C1, and a signal set to indicate [RP, TSCC, SBR]=[1, 0, 0] is transmitted to the intermediate node B (B1, B2) in operation 45. Although not illustrated in FIG. 6, if a plurality of intermediate nodes are provided, the intermediate node B (B1, B2) may transmit the same signal indicating [RP, TSCC, SBR]=[1, 0, 0] to adjacent intermediate nodes thereof.

As a result of operation 45, the LCR protocol suspended in operation 42 is resumed. To that end, each node (or a port of each node) transmits to any adjacent node an HO OPUk OH signal indicating [REMOVE, # a, ACK] and [1, 0, 0] respectively corresponding to [CTRL, TPID, TSGS] and [RP, TSCC, SBR] of HO OPUk RCOH in operation 46.

As such, if a signal set as CTRL=REMOVE and TSGS=ACK is exchanged in two directions, each node (or a port of each node) starts a link connection decreasing procedure. Specifically, each node transmits a signal set as [NORM, # a, ACK], rather than [REMOVE, # a, ACK], (for example, a signal set to indicate [RP, TSCC, SBR]=[1, 0, 0]) to every TS at a resize multiframe boundary after receiving the signal including CTRL=REMOVE and TSGS=ACK (for example, a signal set to indicate [RP, TSCC, SBR]=[1, 0, 0]). in operation 47. After transmitting [NORM, # a, ACK], each node starts to decrease a link connection in operation 48. That is, after the change of [REMOVE, # a, ACK] into [NORM, # a, ACK], each node notifies a downstream port that link connection decrease will starts at the next resize multiframe boundary.

After completing LCR resize and receiving a signal set to have "NORM" in the CTRL field, each of the nodes A, B and C transmits a signal set to indicate [CTRL, TPID, TSGS]= [IDLE, 0, NACK] and [RP, TSCC, SBR]=[1, 0, 0] to exit from the LCR protocol. In response to a check of receiving a signal indicating "IDLE" in the CTRL field from an adjacent node, the LCR protocol is terminated. If the LCR protocol is completed at the end nodes A and C, the end nodes A and C terminates the HAO protocol and transmit a signal indicating RP=0 to the intermediate node. In response to receiving the signal of RP=0, the intermediate node terminates the HAO protocol, and transmits the signal of RP=0 to an adjacent node. Upon termination of the LCR protocol, the HAO procedure according to the ITU-T G.7044/Y.1347(10/2011) standard is terminated without decreasing bandwidth using the BWR protocol in operation 50.

As described above, in a method for resizing a network connection in an optical transport network that receives an ODUflex signal and support protection switching, both an LCR protocol and a BWR protocol are executed on a working path, but only the LCR protocol, except for the BWR protocol, is executed on a protection path by adding information preventing the BWR protocol from being initiated (for example, Suppress Bandwidth Resize (SBR) bit) to RCOH for the LCR protocol, that is, LCR protocol overhead. It is because a bandwidth of the protection path does not need to be changed through the resize procedure since an actual data signal is not transmitted via the protection path. According to the exemplary embodiment of the present invention, it is possible to resize network connection of a working path even in an optical transport network so as to satisfy the ITU-T G.7044/Y.1347(10/2011) standard. In addition, the resize procedure may be completed by changing or adding a signal to be transmitted and/or received on the protection path according to the ITU-T G.7044/Y.1347(10/2011) standard.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for resizing a network connection in an optical transport network that supports protection switching and receives a flexible Optical channel Data Unit (ODUflex (GFP)) signal,
    wherein a Link Connection Resize (LCR) protocol of Hitless Adjustment of ODUflex(GFP) (HAO) procedure comprises Suppress Bandwidth Resize (SBR) information that prevents a Bandwidth Resize (BWR) protocol from being initiated,
    the method comprising:
    executing, at second nodes located on a working path W for protection switching, both a LCR protocol and a BWR protocol;
    executing, at first nodes located on a protection path P for protection switching, only the LCR protocol and omitting the BWR protocol,
    wherein the SBR information is contained in LCR protocol overhead.

2. The method of claim 1, wherein the SBR information is contained in the LCR protocol overhead as a reserve field (RES) bit of in High Order-Optical channel Payload Unit-k Overhead (HO OPUk OH) Resize Control Overhead (RCOH).

3. The method of claim 1,
    wherein the HAO procedure is a procedure for increasing a network connection,
    wherein the HAO procedure is terminated without executing the BWR protocol by the first nodes receiving the SBR information, the first nodes that operate a Generic Mapping Procedure (GMP) normal mode, rather than a GMP special mode, after completion of the LCR protocol.

4. The method of claim 1,
    wherein the HAO procedure is a procedure for decreasing network connection,
    wherein the HAO procedure is terminated without executing the BWR protocol by the first nodes receiving the SBR information, the first nodes that operate on the GMP normal mode, rather than the GMP special mode, ever since initiation of the LCR protocol.

5. A method for increasing a network connection in an optical transport network that supports protection switching and receives a flexible Optical channel Data Unit (ODUflex (GFP)) signal, the method comprising:
    initiating, at first nodes located on a protection path for the protection switching, a Link Connection Resize (LCR) protocol of Hitless Adjustment of ODUflex(GFP) (HAO) procedure;
    increasing, at the first nodes, a link connection to increase a number of tributary slots (TSs) ; and
    in response to receiving Suppress Bandwidth Resize (SBR) information that prevents execution of a Bandwidth Resize (BWR) protocol, terminating the HAO procedure without executing the BWR protocol at the first nodes.

6. The method of claim 5, wherein the SBR information is contained in LCR protocol overhead.

7. The method of claim 6, wherein the SBR information is contained in the LCR protocol as a reserve field (RES) of High Order-Optical channel Payload Unit-k Overhead (HO OPUk OH) Resize Control Overhead (RCOH).

8. The method of claim 5, wherein, in the terminating of the HAO procedure, the first nodes receiving the SBR information operate on a Generic Mapping Procedure (GMP) normal mode, rather than a GMP special mode after the completion of the LCR protocol.

9. The method of claim 5, wherein, in the initiating of the LCR protocol, a High Order-Optical channel Payload Unit-k Overhead (HO OPUk OH) Resize Control Overhead (RCOH) signal indicating "ADD" in a control (CTRL) field of LCR protocol overhead is used.

10. The method of claim 5, further comprising:
    terminating the HAO procedure by executing, both the LCR protocol and the BWR protocol at second nodes on a working path for the protection switching.

11. A method for decreasing a network connection in an optical transport network that supports protection switching and a flexible Optical channel Data (ODUflex(GFP)) signal, the method comprising:
    initiating, at first nodes located on a protection path for protection switching, a Link Connection Resize (LCR) protocol of Hitless Adjustment of ODUflex(GFP) (HAO) procedure; and
    decreasing, at the first nodes, a link connection to decrease a number of tributary slots (TSs); and
    terminating the HAO procedure by continuously executing the LCR protocol but not executing the BWR protocol at the first nodes when Suppress Bandwidth Resize (SBR) information that prevents execution of a Bandwidth Resize (BWR) protocol of the HAO procedure is received after the initiation of the LCR protocol.

12. The method of claim 11, wherein the SBR information is contained in LCR protocol overhead.

13. The method of claim 12, wherein the SBR information is contained in the LCR protocol overhead as a reserve field (RES) bit of High Order-Optical channel Payload Unit-k Overhead (HO OPUk OH). Resize Control Overhead (RCOH).

14. The method of claim 13, wherein in the terminating of the HAO procedure, the first nodes receiving the SBR information operate on a Generic Mapping Procedure (GMP) normal mode, rather than a GMP special mode.

15. The method of claim 11, wherein in the initiating of the LCR protocol, a High Order-Optical channel Payload Unit-k Overhead (HO OPUk OH) Resize Control Overhead (RCOH) signal indicating "REMOVE" in a control (CTRL) field of LCR protocol overhead is used.

16. The method of claim 11, further comprising:
   terminating the HAO procedure by executing both the LCR protocol and the BWR protocol at the second nodes.

\* \* \* \* \*